United States Patent
Oyama et al.

(10) Patent No.: US 10,708,035 B2
(45) Date of Patent: Jul. 7, 2020

(54) SIGNAL PROCESSING DEVICE AND SIGNAL PROCESSING METHOD

(71) Applicant: FUJITSU LIMITED, Kawasaki-shi, Kanagawa (JP)

(72) Inventors: Tomofumi Oyama, Kawasaki (JP); Hisao Nakashima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/226,893

(22) Filed: Dec. 20, 2018

(65) Prior Publication Data

US 2019/0215145 A1 Jul. 11, 2019

(30) Foreign Application Priority Data

Jan. 11, 2018 (JP) .................. 2018-002391

(51) Int. Cl.
H04B 10/08 (2006.01)
H04B 17/00 (2015.01)
H04L 7/00 (2006.01)
H04B 10/61 (2013.01)
H04B 10/079 (2013.01)
H04B 10/588 (2013.01)
H04B 10/50 (2013.01)

(52) U.S. Cl.
CPC ....... *H04L 7/0058* (2013.01); *H04B 10/0795* (2013.01); *H04B 10/5053* (2013.01); *H04B 10/588* (2013.01); *H04B 10/613* (2013.01); *H04B 10/616* (2013.01); *H04B 10/6164* (2013.01); *H04L 7/0075* (2013.01); *H04L 2201/08* (2013.01)

(58) Field of Classification Search
CPC .................................................. H04B 10/0795
See application file for complete search history.

(56) References Cited

U.S. PATENT DOCUMENTS

| 6,701,163 | B1* | 3/2004 | Hiramatsu | H03G 3/3042 370/206 |
|---|---|---|---|---|
| 2007/0201308 | A1* | 8/2007 | Wassermann | E21B 47/18 367/82 |
| 2008/0187038 | A1* | 8/2008 | Currivan | H04L 25/03057 375/233 |
| 2009/0207955 | A1* | 8/2009 | Hoshuyama | H03H 21/0012 375/346 |
| 2009/0232501 | A1* | 9/2009 | Dai | H04B 10/27 398/66 |
| 2010/0003028 | A1* | 1/2010 | Zhang | H04B 10/61 398/65 |
| 2010/0209121 | A1 | 8/2010 | Tanimura | |
| 2011/0249981 | A1 | 10/2011 | Deczky et al. | |

(Continued)

FOREIGN PATENT DOCUMENTS

JP 2010-193204 9/2010

*Primary Examiner* — David C Payne
*Assistant Examiner* — Pranesh K Barua
(74) *Attorney, Agent, or Firm* — Fujitsu Patent Center

(57) ABSTRACT

A signal processing device includes: a filter configured to perform an adaptive equalization process of a signal, on a basis of a filter coefficient; an updater configured to update the filter coefficient, on a basis of amplitude of the signal and a target value of the amplitude; and a corrector configured to correct the target value, on a basis of the amplitude of the signal.

6 Claims, 13 Drawing Sheets

(56) References Cited

U.S. PATENT DOCUMENTS

| | | | |
|---|---|---|---|
| 2012/0128377 A1* | 5/2012 | Hatae | H04B 10/616 398/208 |
| 2014/0064345 A1* | 3/2014 | Sugitani | H04L 25/03038 375/224 |
| 2016/0301480 A1* | 10/2016 | Ide | H04B 10/801 |
| 2017/0041080 A1* | 2/2017 | Tanaka | H04B 10/61 |

* cited by examiner

SIGNAL PROCESSING DEVICE AND SIGNAL PROCESSING METHOD

CROSS-REFERENCE TO RELATED APPLICATION

This application is based upon and claims the benefit of priority of the prior Japanese Patent Application No. 2018-002391, filed on Jan. 11, 2018, the entire contents of which are incorporated herein by reference.

FIELD

A certain aspect of embodiments described herein relates to a signal processing device and a signal processing method.

BACKGROUND

A digital coherent transmission method, in which transmission of 100 (Gbps) or more is achieved by using a single wavelength light, is being developed, as demand of large capacity data transmission increases. In the digital coherent transmission method, in addition to optical intensity, an optical phase is also used in modulation of a signal, being different from intensity modulation method. The modulation method is such as PSK (Phase Shift Keying) or QAM (Quadrature Amplitude Modulation.

In the modulation method, a skew, a power difference and an orthogonal deviation (phase rotation) between an in-phase component signal and a quadrature phase component signal may occur in each of a transmitter and a receiver, because of various factors. The phenomena is called IQ distortion (alternatively, IQ unbalance or IQ imperfect) and may cause signal degradation. On other hand, there is disclosed a compensation means of IQ distortion caused in the receiver (for example, see Japanese Patent Application No. 2010-193204 and US Patent Application Publication No. 2011/0249981).

SUMMARY

According to an aspect of the present invention, there is provided a signal processing device including: a filter configured to perform an adaptive equalization process of a signal, on a basis of a filter coefficient; an updater configured to update the filter coefficient, on a basis of amplitude of the signal and a target value of the amplitude; and a corrector configured to correct the target value, on a basis of the amplitude of the signal.

According to another aspect of the present invention, there is provided a signal processing method including: performing an adaptive equalization process of a signal, on a basis of a filter coefficient; updating the filter coefficient, on a basis of amplitude of the signal and a target value of the amplitude; and correcting the target value, on a basis of the amplitude of the signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

It is difficult to compensate for IQ distortion caused by a transmitter, because of influence of noise, polarized wave fluctuation, and a frequency off-set between a signal light and a local oscillation light that occur in a transmission path as in the case of Gauss noise or phase noise. Therefore, when a signal with the IQ distortion is input to an AEQ (Adaptive Equalizer) circuit of a receiver, an error of operation processing of the circuit may be large in a case where a tap coefficient of a FIR (Finite Impulse Response) filter is updated by an algorithm treating signal amplitude as a target value as in the case of a CMA (Constant Module Algorithm). Therefore, the adaptive equalization circuit may not necessarily sufficiently compensate for the influence of characteristic of the transmission path with respect to a signal with the IQ distortion and may reduce signal quality.

Figure 1:
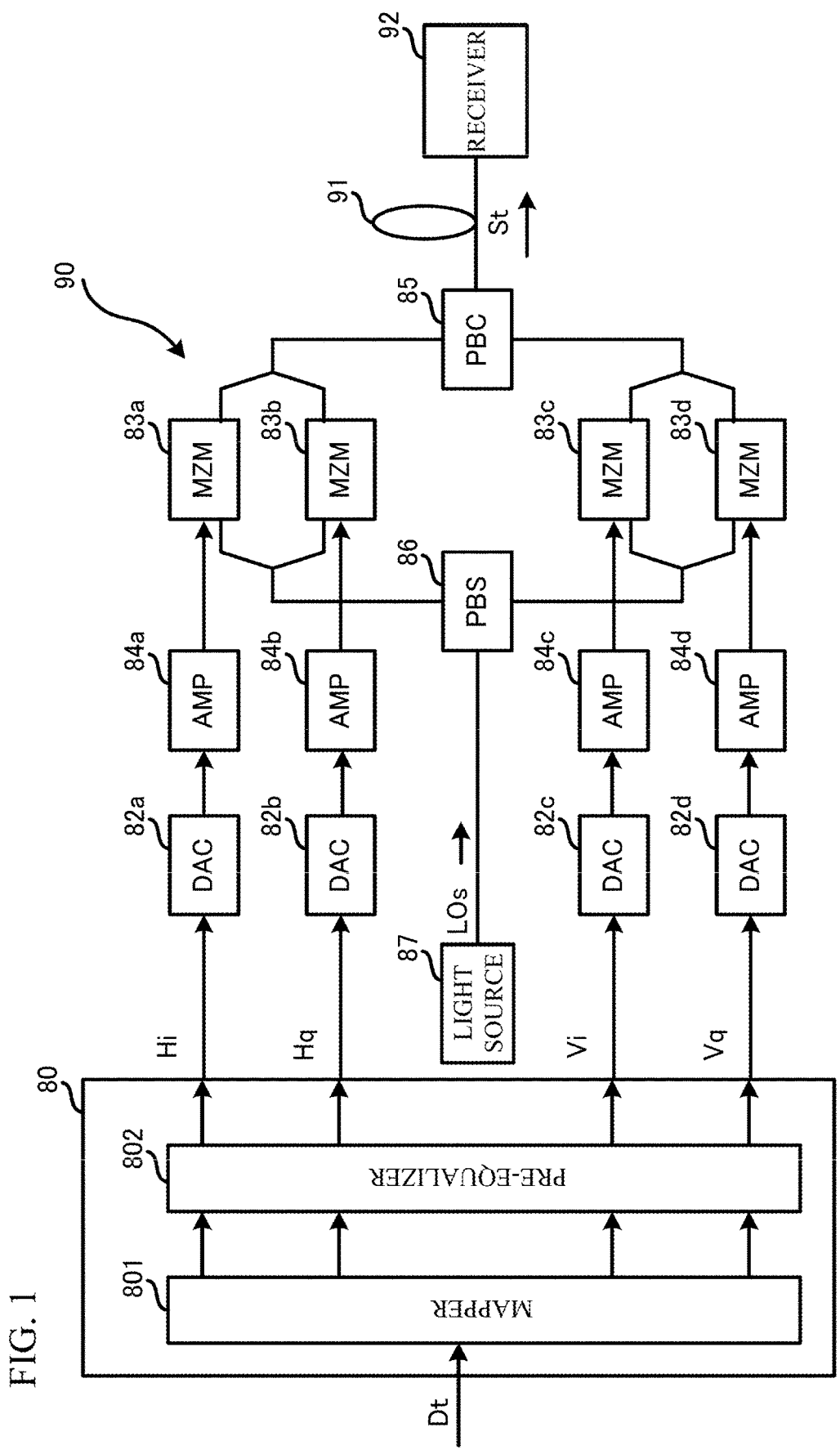
FIG. 1 illustrates an example of a transmitter.

A description will be given of embodiments. FIG. 1 illustrates an example of a transmitter 90. The transmitter 90 uses an optical polarization division multiplexing method and transmits an optical signal St to a receiver 92 via a transmission path 91 such as an optical fiber, in accordance with a digital coherent optical transmission method.

The transmitter 90 has a transmission processing circuit 80, digital-analog converters (DAC: Digital-to-Analog converter) 82a to 82d, a Mach-Zehnder modulators (MZM) 83a to 83d. Moreover, the transmitter 90 has a polarization beam combiner (PBC) 85, a polarization beam splitter (PBS) 86 and a light source 87.

The transmission processing circuit 80 generates digital signals Hi, Hq, Vi and Vq from a data signal Dt which is input from another device. The transmission processing circuit 80 has a mapper 801 and a pre-equalizer 802. The transmission processing circuit 80 may be such as a DSP (Digital Signal Processor) or FPGA (Field Programmable Gate Array). The transmission processing circuit 80 may have a function such as pulse forming.

The mapper 801 maps the data signal Dt to symbols of a modulation process. The modulation method may be such as QPSK (Quadrature PSK), BPSK (Binary PSK) or QAM. The mapper 801 performs a mapping process of a data component of the data signal Dt assigned to a H polarized wave and a V polarized wave. The mapper 801 outputs a data component of the H polarized wave and a data component of the V polarized wave to the pre-equalizer 802.

The pre-equalizer 802 performs a pre-equalization process with respect to the data component of the H polarized wave and the data component of the V polarized wave. For example, the pre-equalizer 802 suppresses distortion of a signal wave caused by transmission path characteristic, by electrically giving characteristic that is opposite to the transmission path characteristic of the transmission path 91 to the data components. The pre-equalizer 802 outputs the data component of the H polarized wave and the data component of the V polarized wave to the DACs 82a to 82d as the digital signals Hi, Hq, Vi and Vq.

The digital signal Hi is an in-phase component of the H polarized wave. The digital signal Hq is a quadrature component of the H polarized wave. The digital signal Vi is an in-phase component of the V polarized wave. The digital signal Vq is a quadrature component of the V polarized wave.

The DACs 82a to 82d convert each of the digital signals Hi, Hq, Vi and Vq into each of analog signals. Each of the analog signals is respectively input into the MZMs 83a to 83d. The DACs 82a to 82d may be included in the transmission processing circuit 80.

The light source 87 includes a laser diode and so on and outputs a transmission light LOs having a predetermined center frequency to the PBS 86. The PBS 86 divides the transmission light LOs to the H axis and the V axis (polarization axis). A H polarized wave component of the transmission light LOs is input into the MZM 83a and 83b. A V polarized wave component of the transmission light LOs is input into the MZMs 83c and 83d.

The MZMs 83a to 83d optically modulate the transmission light LOs, in accordance with the analog signals from the DACs 82a to 82d. In concrete, the MZMs 83a and 83b optically modulate the H-axis component of the transmission light LOs, in accordance with the analog signals from the DACs 82a and 82b. The MZMs 83c and 83d optically modulate the V-axis component of the transmission light LOs, in accordance with the analog signals from the DACs 82c and 82d.

The H-axis component and the V-axis component of the modulated transmission light LOs are input into the PBC 85. The PBC 85 generates an optical signal St by polarization-multiplexing the H-axis component and the V-axis component of the transmission light LOs and outputs the optical signal St to the transmission path 91.

Figure 2:
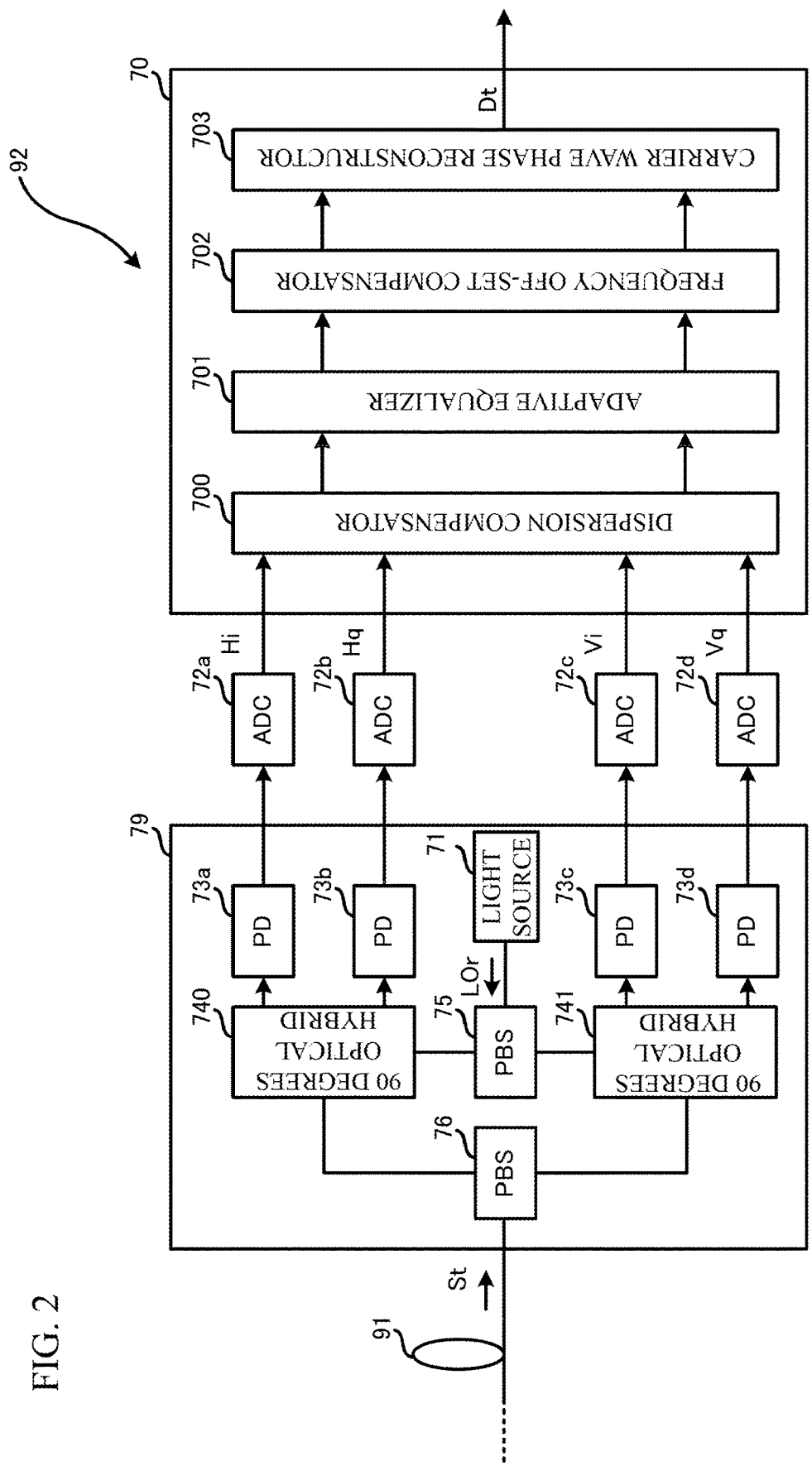
FIG. 2 illustrates an example of a receiver.

FIG. 2 illustrates an example of the receiver 92. The receiver 92 receives the optical signal St from the transmitter 90.

The receiver 92 is an example of a signal processing device and has a reception processing circuit 70, ADCs 72a to 72d and a front end unit 79. The front end unit 79 has a light source 71, balance type photodiodes (PD) 73a to 73d, 90 degrees optical hybrid circuits 740 and 741 and PBSs 75 and 76.

The PBS 76 divides the optical signal St to a H-axis component and a V-axis component, outputs the H-axis component to the 90 degrees optical hybrid circuit 740 and outputs the V-axis component to the 90 degrees optical hybrid circuit 741. The light source 71 includes a laser diode and so on and inputs a local oscillation light LOr having a predetermined center frequency to the PBS 75. The PBS 75 divides the local oscillation light LOr to a H-axis component and a V-axis component, outputs the H-axis component to the 90 degrees optical hybrid circuit 740 and outputs the V-axis component to the 90 degrees optical hybrid circuit 741.

The 90 degrees optical hybrid circuit 740 has a waveguide for interfering the H-axis component of the optical signal St with the H-axis component of the local oscillation light LOr and detects the H-axis component of the optical signal St. The 90 degrees optical hybrid circuit 740 outputs optical components according to amplitude and a phase of an in-phase component and a quadrature component to the PDs 73a and 73b.

The 90 degrees optical hybrid circuit 741 has a waveguide for interfering the V-axis component of the optical signal St with the V-axis component of the local oscillation light LOr and detects the V-axis component of the optical signal St. The 90 degrees optical hybrid circuit 741 outputs optical components according to amplitude and a phase of an in-phase component and a quadrature component to the PDs 73c and 73d.

The PDs 73a to 73d convert the optical components, which are input from the 90 degrees optical hybrid circuits 740 and 741, into electrical signals. The PDs 73a to 73d output each of the electrical signals into each of the ADCs 72a to 72d. The ADCs 72a to 72d respectively convert the electrical signals input from the PDs 73a to 73d into digital signals Hi, Hq, Vi and Vq. The digital signals Hi, Hq, Vi and Vq are input into the reception processing circuit 70.

The reception processing circuit 70 has a dispersion compensator 700, an adaptive equalizer 701, a frequency off-set compensator 702 and a carrier wave phase re-constructor 703. For example, the reception processing circuit 70 may be such as a DSP, FPGA or the like. The reception processing circuit 70 may have another function other than the above-mentioned function.

The dispersion compensator 700 compensates for wave distortion of the optical signal St caused by the wavelength dispersion on the transmission path 91, on the basis of a fixed parameter. The dispersion compensator 700 outputs the digital signals Hi, Hq, Vi and Vq into the adaptive equalizer 701.

The adaptive equalizer 701 performs an adaptive equalization process with respect to the digital signals Hi, Hq, Vi and Vq. In concrete, the adaptive equalizer 701 compensates for the wave distortion of the optical signal St caused by the wavelength dispersion or non-linear optical effect on the transmission path 91, on the basis of a dynamic parameter.

The adaptive equalizer 701 compensates for quality degradation of the optical signal St. In concrete, the adaptive equalizer 701 corrects the waveform of the digital signals Hi, Hq, Vi and Vq by giving characteristic, which is opposite to the characteristic of the transmission path 91, to the digital signals Hi, Hq, Vi and Vq by a FIR filter. The adaptive equalizer 701 outputs the digital signals Hi, Hq, Vi and Vq into the frequency off-set compensator 702. The structure of the adaptive equalizer 701 will be described later.

The frequency off-set compensator 702 compensates for a frequency difference and a phase difference between the carrier wave frequency of the digital signals Hi, Hq, Vi and Vq and the light source 71 so that the digital signals Hi, Hq, Vi and Vq are normally demodulated by a signal constellation (signal space diagram) according the modulation method. The frequency off-set compensator 702 outputs the digital signals Hi, Hq, Vi and Vq into the carrier wave phase re-constructor 703.

The carrier wave phase re-constructor 703 removes the noise component of the digital signals Hi, Hq, Vi and Vq, estimates a correct carrier wave phase, and synchronizes the phase of the digital signals Hi, Hq, Vi and Vq with the estimated carrier wave phase. The digital signals Hi, Hq, Vi and Vq re-constructed in this manner are output to another device from the receiver 92.

In the above-mentioned structure, in the transmitter 90, IQ distortion may occur in the optical signal St because of incompleteness of quenching characteristic of the MZMs 83a to 83d. Therefore, the optical signal St having the IQ distortion is input into the receiver 92 as well as the influence of the noise component on the transmission path 91 such as a Gauss noise or a phase noise. Therefore, the digital signals Hi, Hq, Vi and Vq obtained from the optical signal St include the noise component and the IQ distortion on the transmission path 91.

Figure 3:
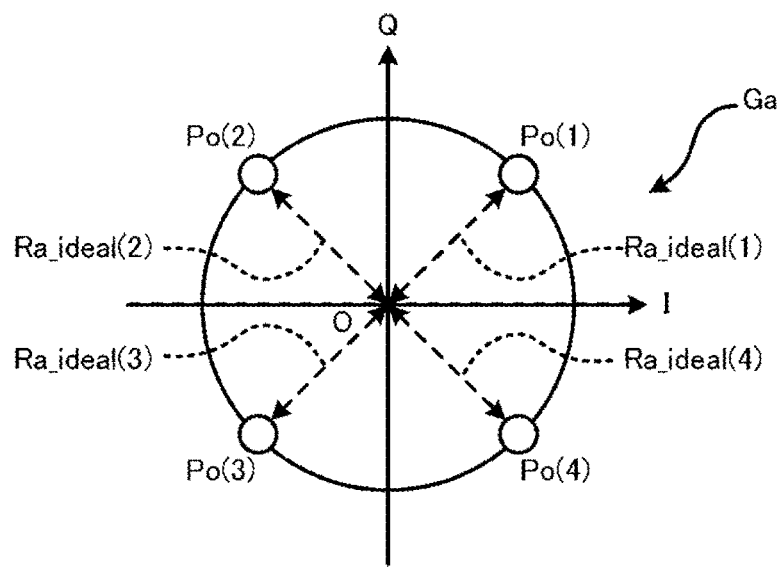
FIG. 3 illustrates IQ distortion.
Figure 3:
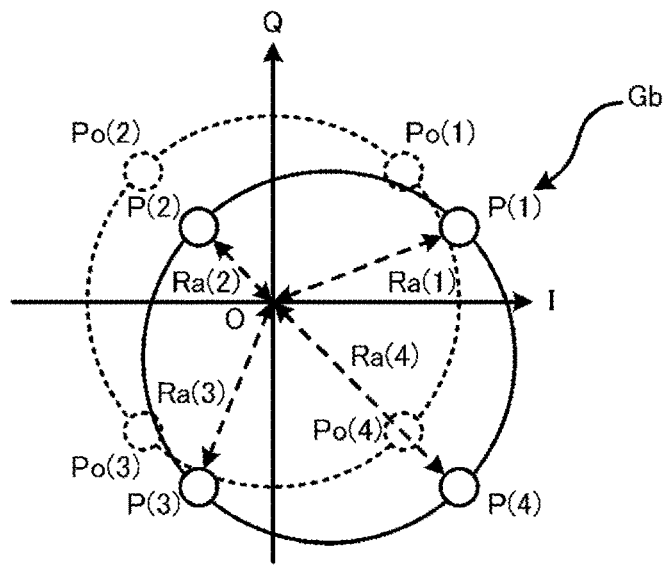
Figure 3:
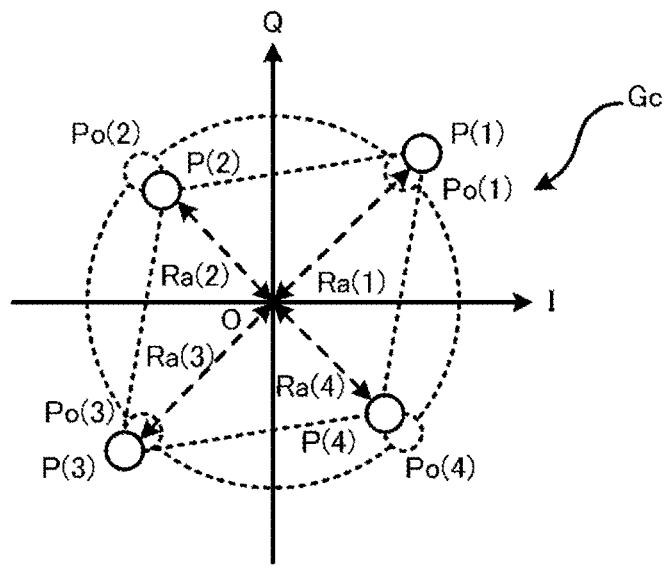

FIG. 3 illustrates the IQ distortion. In the example, QPSK is used as the modulation method.

A code Ga indicates arrangements of signal points Po(1) to Po(4) that are theoretical signal points of the digital signals Hi, Hq, Vi and Vq in an IQ plane. The signal points Po(1) to Po(4) are symmetrically positioned with each other with respect to the original point O. Therefore, a distance between the signal points Po(1) to Po(4) and the original point O, that is amplitudes Ra_ideal (1) to Ra_ideal (4), are equal to each other.

The code Gb indicates arrangements of signal points P(1) to P(4) that are signals in a case where a DC (Direct Current) off-set occurs in the digital signals Hi, Hq, Vi and Vq because of incompleteness of the quenching characteristic of the MZMs 83a to 83d of the transmitter 90. A dotted line indicates the arrangements of the theoretical signal points Po(1) to Po(4).

An extinction ratio of the transmitter 90 is degraded and an optical component leaking to the transmission path 91 in a no-signal condition that the optical signal St is not output increases, when the quenching characteristic of the MZMs 83a to 83d is bad. Therefore, the arrangements of the signal points P(1) to P(4) are shifted from the arrangements of the theoretical signal points Po(1) to Po(4). Thus, there is an error between the amplitude Ra(1) to Ra(4) of the signal points P(1) to P(4) and the amplitude Ra_ideal(1) to Ra_ideal(4) of the theoretical signal points Po(1) to Po(4).

The code Gc indicates the arrangements of the signal points P(1) to P(4) in a case where IQ quadrature shift occurs in the digital signals Hi, Hq, Vi and Vq because of shift in the quadrature modulation of the MZMs 83a to 83d. The dotted line indicates the arrangements of the theoretical signal points Po(1) to Po(4).

In this case, the arrangements of the signal points P(1) to P(4) are shifted from the arrangements of the theoretical signal points Po(1) to Po(4). Therefore, there is an error between the amplitude Ra(1) to Ra(4) of the signal points P(1) to P(4) and the amplitude Ra_ideal(1) to Ra_ideal(4) of the theoretical signal points Po(1) to Po(4).

As illustrated in FIG. 2, the adaptive equalizer 701 compensates the digital signals Hi, Hq, Vi and Vq for the noise component on the transmission path 91, by estimating the characteristic of the transmission path 91. In this case, the adaptive equalizer 701 updates a tap coefficient of a FIR filter by using algorithm of which a target value is amplitude of the digital signals Hi, Hq, Vi and Vq as in the case of CMA or RDE (Radius Directed Equalization).

However, when the digital signals Hi, Hq, Vi and Vq include the IQ distortion, the error of a calculation process for updating the tap coefficient may be enlarged. Therefore, the adaptive equalizer 701 does not sufficiently compensate the digital signals Hi, Hq, Vi and Vq having the IQ distortion for the influence of the transmission path characteristic. And the signal quality may be degraded.

And so, the adaptive equalizer 701 corrects the target value of amplitude, on the basis of the amplitude of the digital signals Hi, Hq, Vi and Vq in the updating of the tap coefficient. Therefore, the adaptive equalizer 701 can reduce the difference between the amplitude and the target value. And the adaptive equalizer 701 can suppress the control amount of the amplitude based on the algorithm such as the CMA or RDE. Accordingly, the adaptive equalizer 701 can reduce the influence of the IQ distortion with respect to the compensation of the noise component on the transmission path 91, by reducing a compensation amount of the IQ distortion with respect to the digital signals Hi, Hq, Vi and Vq. In the following, a description will be given of a structure of the adaptive equalizer 701.

Figure 4:
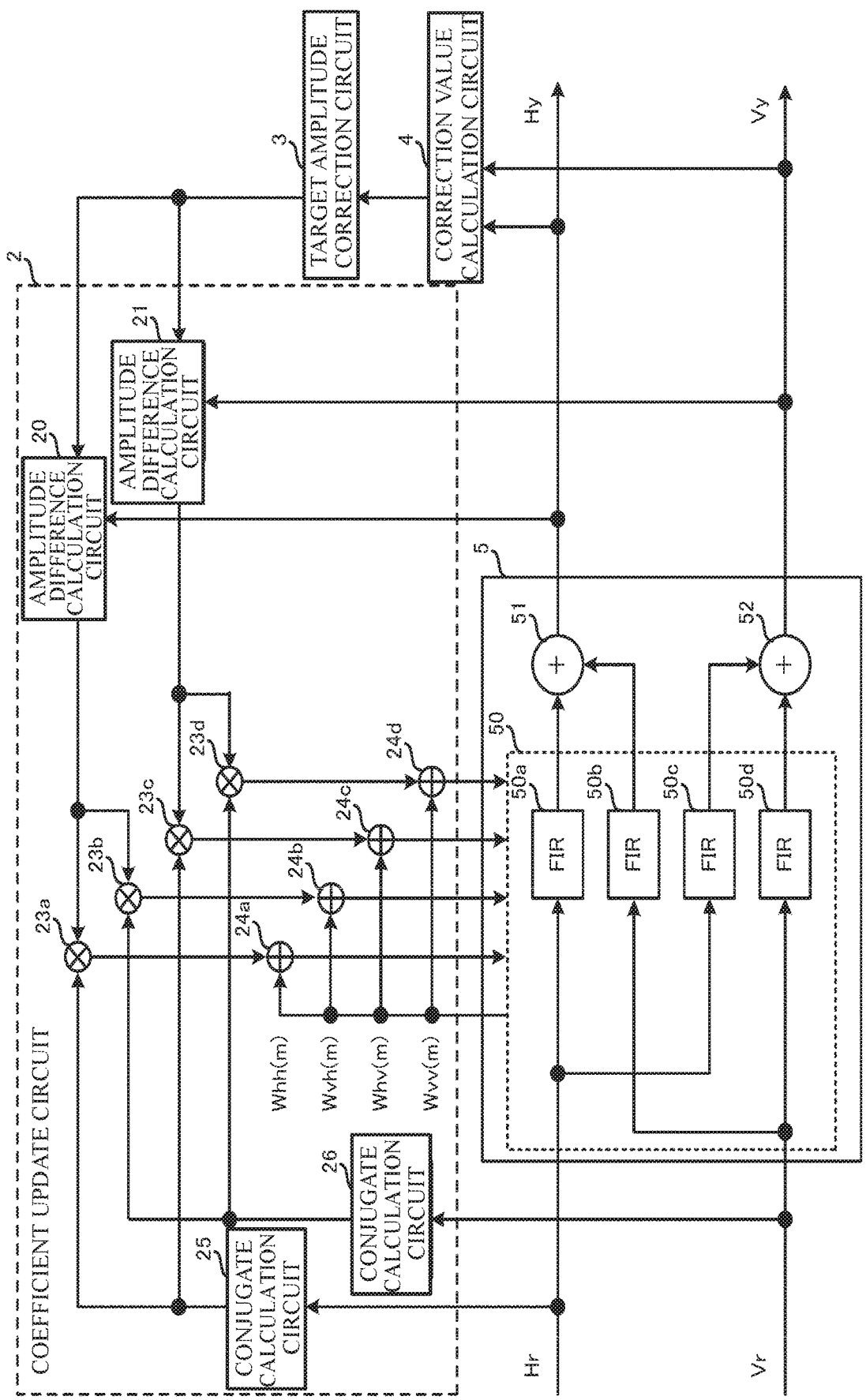
FIG. 4 illustrates a structure diagram of an adaptive equalizer.

FIG. 4 illustrates a structure diagram of the adaptive equalizer 701. The adaptive equalizer 701 has a coefficient update circuit 2, a target amplitude correction circuit 3, a correction value calculation circuit 4 and a filter 5.

The coefficient update circuit 2, the target amplitude correction circuit 3 and the correction value calculation circuit 4 may be separated from the reception processing circuit 70 and may be structured with a hardware such as FPGA. Alternatively, the coefficient update circuit 2, the target amplitude correction circuit 3 and the correction value calculation circuit 4 may be functions of software, as described later. An input signal Hr of the H polarized wave is a signal synthesized from the digital signals Hi and Hq. An input signal Vr of the V polarized wave is a signal synthesized from the digital signals Vi and Vq.

The filter 5 performs the adaptive equalization process of the input signals Hr and Vr, on the basis of tap coefficients Whh(m), Wvh(m), Whv(m) and Wvv(m). The filter 5 outputs the input signals Hr and Vr subjected to the adaptive equalization process, as output signals Hy and Vy. The tap coefficients Whh(m), Wvh(m), Whv(m) and Wvv(m) may be examples of the filter coefficients.

The filter 5 has a filter circuit 50 and adders 51 and 52. The filter circuit 50 includes FIR filters 50a to 50d that are connected so as to structure a butterfly type filter circuit. The input signal Hr of the H polarized wave is input into the FIR filters 50a and 50c. The input signal Vr of the V polarized wave is input into the FIR filters 50b and 50d.

The coefficient update circuit 2 sets the tap coefficients Whh(m), Wvh(m), Whv(m) and Wvv(m) with respect to the filter circuit 50. The filter circuit 50 has a memory for storing the tap coefficients Whh(m), Wvh(m), Whv(m) and Wvv(m).

The FIR filter 50a filters the input signal Hr by using the tap coefficient Whh(m) and outputs the filtered input signal Hr to the adder 51. The FIR filter 50c filters the input signal Hr by using the tap coefficient Whv(m) and output the filtered input signal Hr to the adder 52. The FIR filter 50b filters the input signal Vr by using the tap coefficient Wvh(m) and outputs the filtered input signal Vr to the adder 51. The FIR filter 50d filters the input signal Vr by using the tap coefficient Wvv(m) and outputs the filtered input signal Vr to the adder 52.

The adder 51 generates an output signal Hy by adding each signal from the FIR filters 50a and 50b with each other, and outputs the output signal Hy. The adder 52 generates an output signal Vy by adding each signal from the FIR filters 50c and 50d with each other, and outputs the output signal Vy.

The coefficient update circuit 2 updates the tap coefficients Whh(m), Wvh(m), Whv(m) and Wvv(m) on the basis of the input signals Hr and Vr and the output signals Hy and Vy and sets the updated tap coefficients in the filter circuit 50. The tap coefficients Whh(m), Wvh(m), Whv(m) and Wvv(m) are updated by using a predetermined test pattern data that is periodically inserted into the optical signal St.

Figure 5:
FIG. 5 illustrate a structure diagram of an optical signal St.

FIG. 5 illustrate a structure diagram of the optical signal St. The optical signal St includes a user data and the test pattern data. The test pattern data is such as a known training sequence or a pilot symbol. A ratio of the test pattern data with respect to all data is a few percentages. In the test pattern data, a plurality of types of symbols are chronologically arrayed in a predetermined order. With respect to the types of the symbols, in the case of FIG. 3, the signal points Po(1) to Po(4) correspond to symbols of the digital values "00", "01", "10" and "11".

As illustrated in FIG. 4, the coefficient update circuit 2 includes amplitude difference calculation circuits 20 and 21, multipliers 23a to 23d, adders 24a to 24d and complex conjugate calculation circuits 25 and 26. The coefficient update circuit 2 is an example of an updater and updates the tap coefficients Whh(m), Wvh(m), Whv(m) and Wvv(m), on the basis of the amplitude of the input signals Hr and Vr and the output signals Hy and Vy and a target value of the amplitude.

$$Lh = \mu (Ra(k)^2 - |yh(m)|^2) yh(m) \quad (1)$$

$$Lv = \mu (Ra(k)^2 - |yv(m)|^2) yv(m) \quad (2)$$

The amplitude difference calculation circuits 20 and 21 calculate the variables Lh and Lv regarding the difference between the amplitude (complex amplitude) yh(m) and yv(m) of the output signals Hy and Vy and the target value Ra(k). For example, the amplitude difference calculation circuit 20 calculates the variable Lh from the formula (1). The amplitude difference calculation circuit 21 calculates the variable Lv from the formula (2). In the formula (1) and the formula (2), "μ" is a fixed value that is set in accordance with the transmission condition. The variable "k" is a value determined in accordance with the type of the symbol. The amplitude difference calculation circuit 20 outputs the variable Lh into the multipliers 23a and 23b. The amplitude difference calculation circuit 21 outputs the variable Lv into the multipliers 23c and 23d.

The complex conjugate calculation circuits 25 and 26 calculate the complex conjugate values rh*(m) and rv*(m) of the amplitude (complex conjugate amplitude) rh(m) and rv(m) from the input signals Hr and Vr. The complex conjugate calculation circuit 25 outputs the complex conjugate value rh*(m) to the multipliers 23a and 23c. The complex conjugate calculation circuit 26 outputs the complex conjugate value rv*(m) to the multipliers 23b and 23d.

The multiplier 23a multiplies the complex conjugate value rh*(m) with the variable Lh and outputs the multiplied value to the adder 24a. The adder 24a calculates a new tap coefficient Whh(m+1) by adding the current tap coefficient Whh(m) to the input value that is input from the multiplier 23a and sets the new tap coefficient Whh(m+1) in the filter circuit 50.

The multiplier 23b multiplies the complex conjugate value rv*(m) with the variable Lh and outputs the multiplied value to the adder 24b. The adder 24b calculates a new tap coefficient Wvh(m+1) by adding the current tap coefficient Wvh(m) to the input value that is input from the multiplier 23b and sets the new tap coefficient Wvh(m+1) in the filter circuit 50.

The multiplier 23c multiplies the complex conjugate value rh*(m) with the variable Lv and outputs the multiplied value to the adder 24c. The adder 24c calculates a new tap coefficient Whv(m+1) by adding the current tap coefficient Whv(m) to the input value that is input from the multiplier 23c and sets the new tap coefficient Whv(m+1) in the filter circuit 50.

The multiplier 23d multiplies the complex conjugate value rv*(m) with the variable Lv and outputs the multiplied value to the adder 24d. The adder 24d calculates a new tap coefficient Wvv(m+1) by adding the current tap coefficient Wvv(m) to the input value that is input from the multiplier 23d and sets the new tap coefficient Wvv(m+1) in the filter circuit 50.

$$W(m+1) = w(m) - \mu r^*(m)(Ra(k)^2 - |y(m)|^2) y(m) \quad (3)$$

In this manner, the coefficient update circuit 2 updates the tap coefficients Whh(m), Wvh(m), Whv(m) and Wvv(m) so that the amplitude of the input signals Hr and Vr get closer to the target value Ra(k). The updating process is performed when the test pattern data inserted into the optical signal St is being input into the adaptive equalizer 701. The above-mentioned formula (3) expresses a general relationship between the tap coefficient w(m+1) after the updating and the tap coefficient w(m) before the updating. In the formula (3), the variable y(m) indicates the amplitude of the input signals Hr and Vr. A variable r*(m) is a complex conjugate value of the amplitude of the input signals Hr and Vr.

The target amplitude correction circuit 3 is an example of a corrector and corrects the target value Ra(k), on the basis of the amplitude yh(m) and yv(m) of the output signals Hy and Vy. Therefore, the target amplitude correction circuit 3 approaches the target value Ra(k) to the amplitude yh(m) and yv(m). The coefficient update circuit 2 is capable of suppressing a control amount of a difference between the amplitude yh(m) and yv(m) caused by the IQ distortion and the target value Ra(k).

Thus, the coefficient update circuit 2 is capable of reducing the influence of the IQ distortion with respect to the compensation of the noise component on the transmission path 91. Therefore, the receiver 92 is capable of improving the signal quality.

For example, the target amplitude correction circuit 3 corrects the target value Ra(k) on the basis of the difference ΔR(k) between the amplitude yh(m) and yv(m) and the theoretical amplitude Ra_ideal(k) illustrated in FIG. 3. The correction value calculation circuit 4 is an example of a calculator and calculates the difference ΔR(k). The correction value calculation circuit 4 estimates a gap between the target value Ra(k) and the amplitude yh(m) and yv(m), on the basis of the difference ΔR(k). It is therefore possible for the coefficient update circuit 2 to update the tap coefficients Whh(m), Wvh(m), Whv(m) and Wvv(m), on the basis of the theoretical amplitude Ra_ideal(k), with high accuracy.

$$\Delta Rav(k) = \Sigma_{=1} \{\Delta R(k,n)\}/N = \Sigma_{=1}(Ra\_ideal(k) - |y(k,n)|)/N \quad (4)$$

In concrete, the correction value calculation circuit 4 continuously calculates the difference ΔR(k), N times, on the basis of the formula (4). "N" is an integer which is two or more. The correction value calculation circuit 4 calculates an average ΔRav(k) of the difference ΔR(k). In the formula (4), the variable ΔR(k,n) is the difference ΔR(k) that is calculated in the n-th calculation. "n" is 1, 2, ..., N. The variable y(k,n) is amplitude of symbols of types # k (k=1, 2, 3, 4) that are detected in the n-th detection among N times amplitude detections. Thus the correction value calculation circuit 4 reduces the influence of the noise included in the input signals Hr and Vr. And it is possible to improve the accuracy of the estimation of the gap between the amplitude yh(m) and yv(m) and the target value Ra(k).

The calculation means of the average value ΔRav(k) is not limited. For example, an averaging with a weight may be performed by multiplying a weight coefficient with the difference ΔR(k), in the every n-th times calculation. For example, when the optical signal St is subjected to Dithering by the transmitter 90 in order to detect an optimal operation point, the gap between the target value Ra(k) and the amplitude yh(m) and yv(m) fluctuates with respect to time. In this case, the correction value calculation circuit 4 may change the number N on the basis of the time constant of the changing, in order to correct the target value Ra(k) along the changing.

$$Ra(k)=Ra\_ideal(k)+\Delta Rav(k) \quad (5)$$

The target amplitude correction circuit 3 corrects the target value Ra(k) on the basis of the average value ΔRav(k). For example, the target amplitude correction circuit 3 corrects the target value Ra(k) on the basis of the formula (5) and outputs the corrected target value Ra(k) to the amplitude difference calculation circuits 20 and 21. Thus, the gap between the target value Ra(k) and the amplitude yh(m) and yv(m) is reduced.

Figure 6:
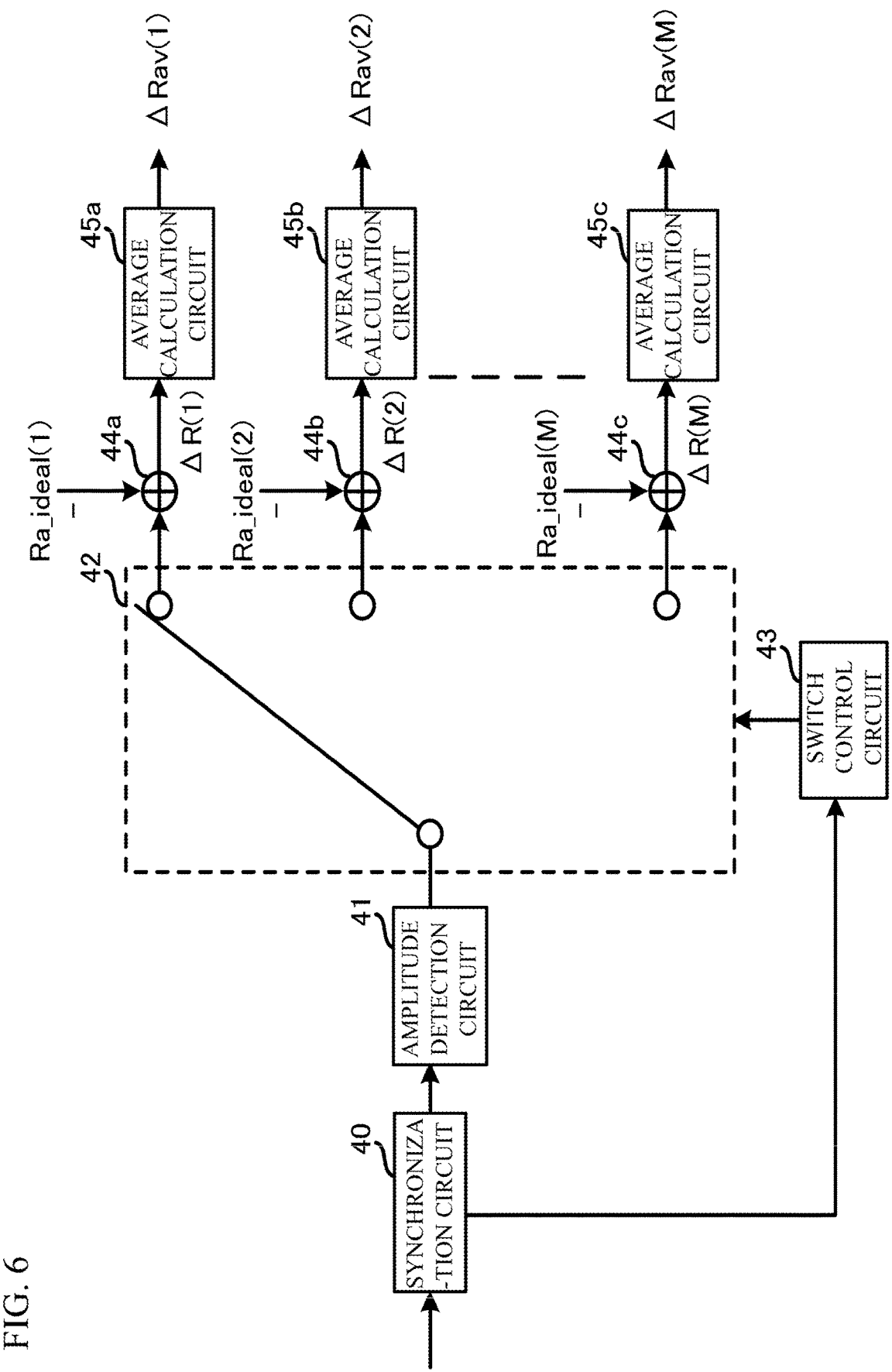
FIG. 6 illustrates a structure diagram of an example of a correction value calculation circuit.

FIG. 6 illustrates a structure diagram of an example of the correction value calculation circuit 4. The correction value calculation circuit 4 has a synchronization circuit 40, an amplitude detection circuit 41, a switch circuit 42, a switch control circuit 43, adders 44a to 44c and average value calculation circuits 45a to 45c.

The synchronization circuit 40 detects a test pattern data included in the output signals Hy and Vy, by performing synchronization detection with respect to the output signals Hy and Vy. The synchronization circuit 40 reports the detection of the test pattern data to the switch control circuit 43. The synchronization circuit 40 inputs the output signals Hy and Vy into the amplitude detection circuit 41. The amplitude detection circuit 41 detects the amplitude yh(m) and yv(m) by detecting a voltage of the input signals Hr and Vr and outputs absolute values of the amplitude yh(m) and yv(m) into the switch circuit 42.

The switch circuit 42 switches the adders 44a to 44c to which the absolute values of the amplitude yh(m) and yv(m) are input, on the basis of the control by the switch control circuit 43. The adders 44a to 44c are respectively provided according to the type # k of the symbol included in the test pattern data. For example, when the modulation method is QPSK, the number of the symbols is 4 (k=1, 2, 3 and 4) as illustrated in FIG. 3.

The switch control circuit 43 controls the switch circuit 42 in accordance with the symbol pattern of the test pattern data which is set in advance, when the synchronization circuit 40 reports the test pattern data to the switch control circuit 43. Therefore, the values of the amplitude yh(m) and yv(m) are output to the adders 44a to 44c.

The adders 44a to 44c reverses the code of the amplitude yh(m) and yv(m) and add the amplitude yh(m) and yv(m) of which the code is reversed to the theoretical amplitude Ra_ideal(1) to Ra_ideal(M). "M" is an integer that is equal to 2 or more. "k" is 1, 2, . . . , M. That is, the adders 44a to 44c respectively calculate the differences ΔR(1) to ΔR(M) between absolute values of the amplitude yh(m) and yv(m) (=y(k,n)) and the theoretical amplitude Ra_ideal(1) to Ra_ideal(M). The differences ΔR(1) to ΔR(M) are input into the average value calculation circuits 45a to 45c.

The average value calculation circuits 45a to 45c respectively calculate the average values ΔRav(1) to ΔRav(M) of the differences ΔR(1) to ΔR(M) that are calculated N times by the adders 44a to 44c, in accordance with the formula (4). The average value calculation circuits 45a to 45c respectively hold the values of the differences ΔR(1) to ΔR(M) every time when the differences ΔR(1) to ΔR(M) are input to the average value calculation circuits 45a to 45c from the adders 44a to 44c, with use of a holding means such as a memory. The average value calculation circuits 45a to 45c respectively calculate the average values ΔRav(1) to ΔRav(M) when the number of the difference ΔR(M) held by the holding means reaches N.

In this manner, the correction value calculation circuit 4 calculates the average values ΔRav(1) to ΔRav(M) of the difference ΔR(1) to ΔR(M) that are calculated by the adders 44a to 44c twice or more. The average values ΔRav(1) to ΔRav(M) are input into the target amplitude correction circuit 3.

Figure 7:
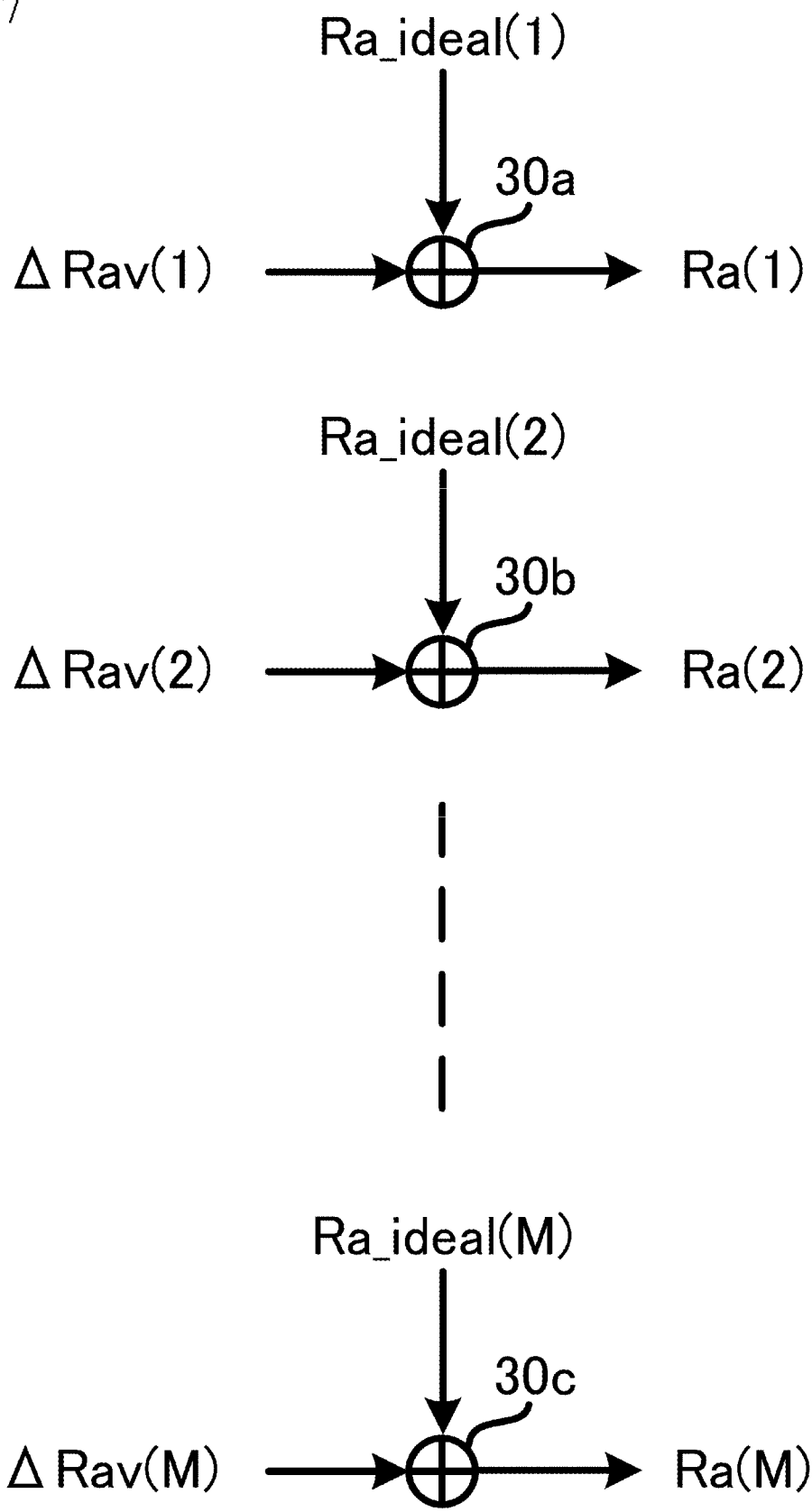
FIG. 7 illustrates a structure diagram of an example of a target amplitude correction circuit.

FIG. 7 illustrates a structure diagram of an example of the target amplitude correction circuit 3. The target amplitude correction circuit 3 has the adders 30a to 30c. The adders 30a to 30c adds the theoretical amplitude Ra_ideal(1) to Ra_ideal(M) to the average values ΔRav(1) to ΔRav(M). Thus, the adders 30a to 30c calculate the corrected target values Ra(1) to Ra(M).

In this manner, the target amplitude correction circuit 3 corrects the target values Ra(1) to Ra(M) on the basis of the average values ΔRav(1) to ΔRav(M). Thus, the correction value calculation circuit 4 reduces the influence of the noise included in the input signals Hr and Vr and is capable of improving the estimation accuracy of the gap between the amplitude yh(m) and yv(m) and the target value Ra(k). The target amplitude correction circuit 3 sets the target values Ra(1) to Ra(M) in the amplitude difference calculation circuits 20 and 21.

The target amplitude correction circuit 3 corrects the target values Ra(1) to Ra(M) with respect to each type # k of the symbols of the test pattern data. Thus, the coefficient update circuit 2 is capable of suppressing the control amount of the gap between the amplitude yh(m) and yv(m) and the target value Ra(k) caused by the IQ distortion, in accordance with the type # k of the symbols.

In the embodiment, the average value calculation circuits 45a to 45c calculate the average values ΔRav(1) to ΔRav(M) of the differences ΔR(1) to ΔR(M) with use of the theoretical amplitude Ra_ideal(1) to Ra_ideal(M). However, the structure it not limited. An average of the absolute values of the amplitude yh(m) and yv(m) may be simply calculated.

Figure 8:
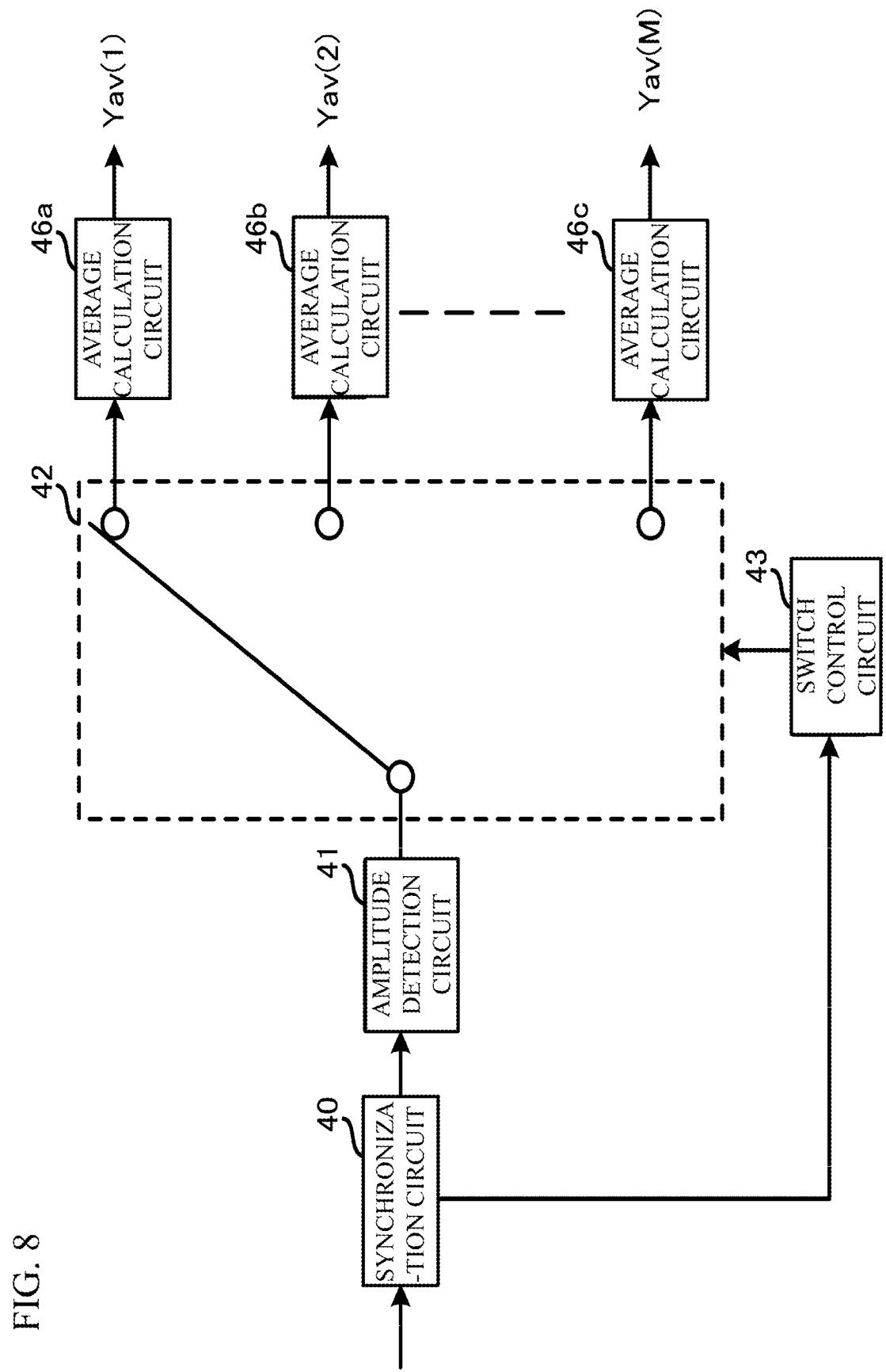
FIG. 8 illustrates another structure diagram of a correction value calculation circuit.

FIG. 8 illustrates another structure diagram of the correction value calculation circuit 4. In FIG. 8, the same numerals are added to the structures that are common with FIG. 6. And, an explanation of the same structures is omitted. The correction value calculation circuit 4 has the synchronization circuit 40, the amplitude detection circuit 41, the switch circuit 42, the switch control circuit 43 and average value calculation circuits 46a to 46c.

The switch control circuit 43 switches the average value calculation circuits 46a to 46c to which the absolute values of the amplitude yh(m) and yv(m) are output, in accordance with the control by the switch control circuit 43. The average value calculation circuits 46a to 46c calculate average values Yav(1) to Yav(M) of the absolute values of the amplitude yh(m) and yv(m) that are detected N times.

A calculation means of the average value Yav(k) is not limited. For example, an averaging with a weight may be performed every time when the amplitude yh(m) and yv(m) are multiplied with a weight according to the detection number. When the transmitter 90 performs dithering with respect to the optical signal St, the average value calculation circuits 46a to 46c correct the target value Ra(k) in accordance with the fluctuation of the optical signal St. Therefore, the detection number N may be changed in accordance with a time constant of the fluctuation.

The average values Yav(1) to Yav(M) are input into the target amplitude correction circuit 3. The target amplitude correction circuit 3 sets the average values Yav(1) to Yav(M) in the amplitude difference calculation circuits 20 and 21, as the target values Ra(1) to Ra(M).

In this manner, the target amplitude correction circuit 3 corrects the target value on the basis of the average values Yav(1) to Yav(M) of the amplitude yh(m) and yv(m) that are detected N times. Therefore, the target amplitude correction circuit 3 is different from the structure of FIG. 6, does not need the adders 44a to 44c and is simply structured.

Next, the effect of the receiver 92 of the embodiment will be described.

Figure 9:
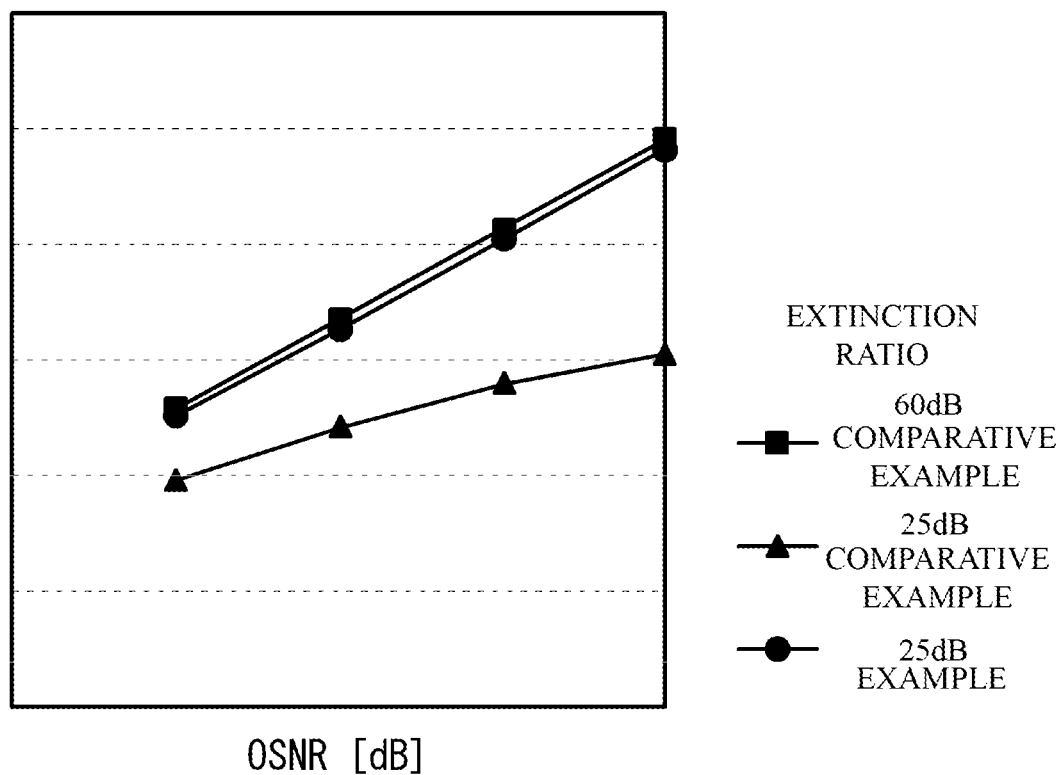
FIG. 9 illustrates characteristic of Q value of each extinction ratio.

FIG. 9 illustrates characteristic of the Q value of each extinction ratio. In FIG. 9, a horizontal axis indicates OSNR (Optical Signal to Noise Ratio) [dB]. A vertical axis indicates the Q value [dB]. The Q value is an example of an index of the signal quality of the transmitter 90 and the receiver 92. The characteristic of the Q value is calculated under a condition that the bit rate is 400 [Gbps], the modulation method is 64 QAM, and the baud rate is 43.84705[baud].

In FIG. 9, as a comparative example, the characteristic of the Q values in a case where the extinction ratio of the transmitter 90 is 60 [dB] and 25 [dB] are illustrated. As an example, the characteristic of the Q value in a case where the extinction ratio of the transmitter 90 is 25 [dB] is illustrated. In the case of the comparative example, the adaptive equalizer 701 does not have the target amplitude correction circuit 3 or the correction value calculation circuit 4, and it is assumed that the target value Ra(k) is not corrected.

The lower the extinction ratio is, the larger the IQ distortion is. However, in the case of the example, even if the extinction ratio is 25 [dB], it is possible to achieve a Q value which is substantially the same as the Q value in a case where the extinction ratio is 60 [dB] and which is higher than the Q value in a case where the extinction ratio is 25 [dB] in the comparative example. Therefore, in the example, it is understood that the signal quality is improved more than the comparative example.

The effect is achieved in a case where the same functions as the coefficient update circuit 2, the target amplitude correction circuit 3 and the correction value calculation circuit 4 are achieved by software.

Figure 10:
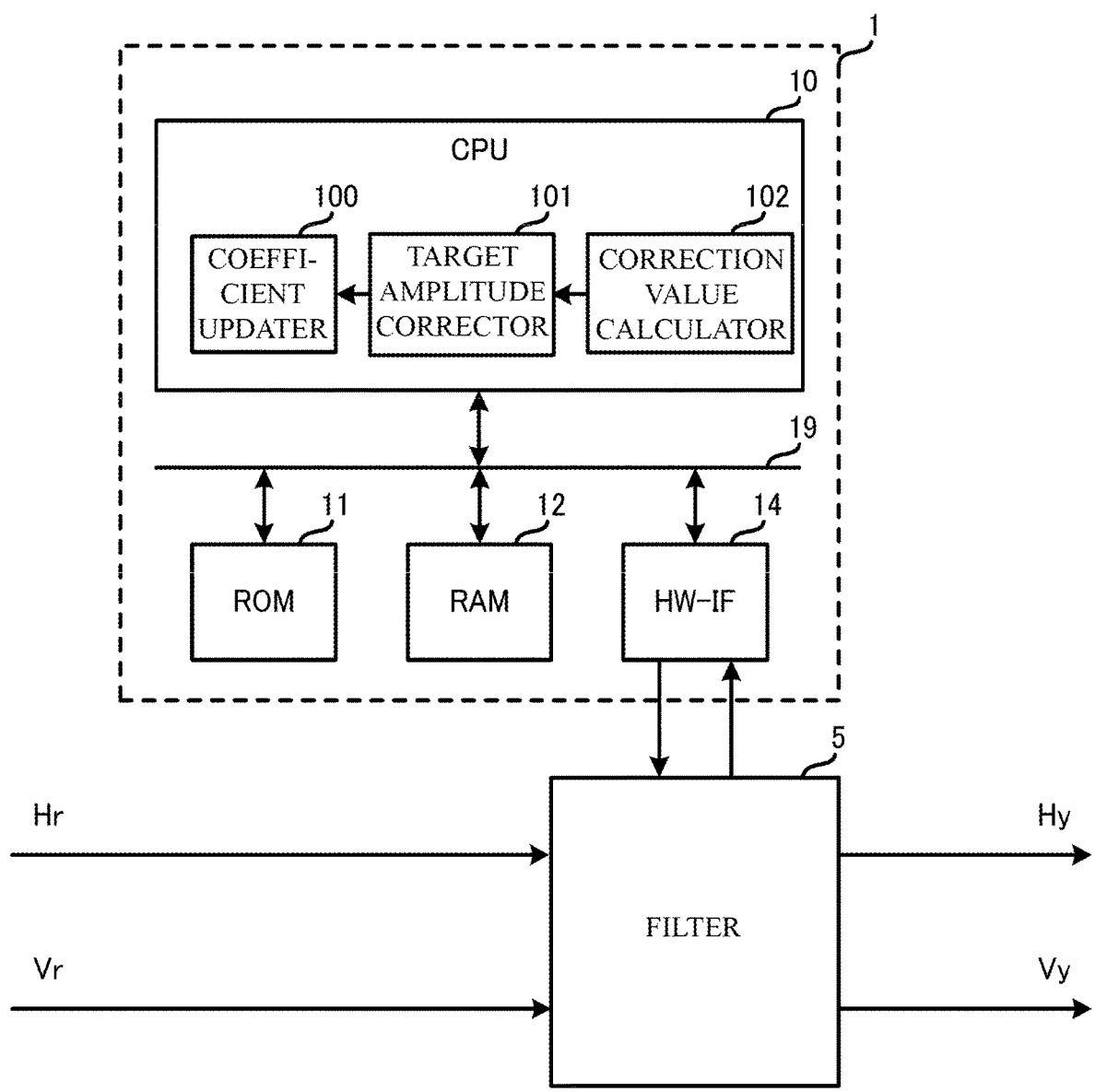
FIG. 10 illustrates a structure diagram of a CPU circuit for updating a tap coefficient.

FIG. 10 illustrates a structure diagram of a CPU (Central Processing Unit) circuit 1 for updating a tap coefficient. In FIG. 10, the same numerals are added to the same structures as FIG. 4. An explanation of the same structures is omitted.

The CPU circuit 1 is provided out of the reception processing circuit 70 and has a CPU 10, a ROM (Read Only Memory) 11, a RAM (Random Access Memory) 12 and a hardware interface (HW-IF) 14. The CPU 10 is connected with the ROM 11, the RAM 12 and the HW-IF 14 via a bus 19 so that inputting and outputting of a signal is achieved.

The ROM 11 stores program for driving the CPU 10. The RAM 12 acts as a working memory of the CPU 10.

The HW-IF 14 connects the CPU circuit 1 with the filter 5 and achieves communication between the CPU 10 and the filter 5. The HW-IF 14 is structured by a logical line such as FPGA.

When the CPU 10 reads the program from the ROM 11, a coefficient updater 100, a target amplitude corrector 101 and the correction value calculator 102 are achieved as functions. The coefficient updater 100 is an example of an updater and performs a function that is substantially the same as that of the coefficient update circuit 2. The target amplitude corrector 101 is an example of a corrector and performs a function that is substantially the same as that of the target amplitude correction circuit 3. The correction value calculator 102 is an example of a calculator and performs a function that is substantially the same as that of the correction value calculation circuit 4.

A description will be given of the processes of the CPU 10 corresponding to the structures of FIG. 6 and FIG. 7. The processes executed by the CPU 10 are examples of a signal processing method of the embodiment.

Figure 11:
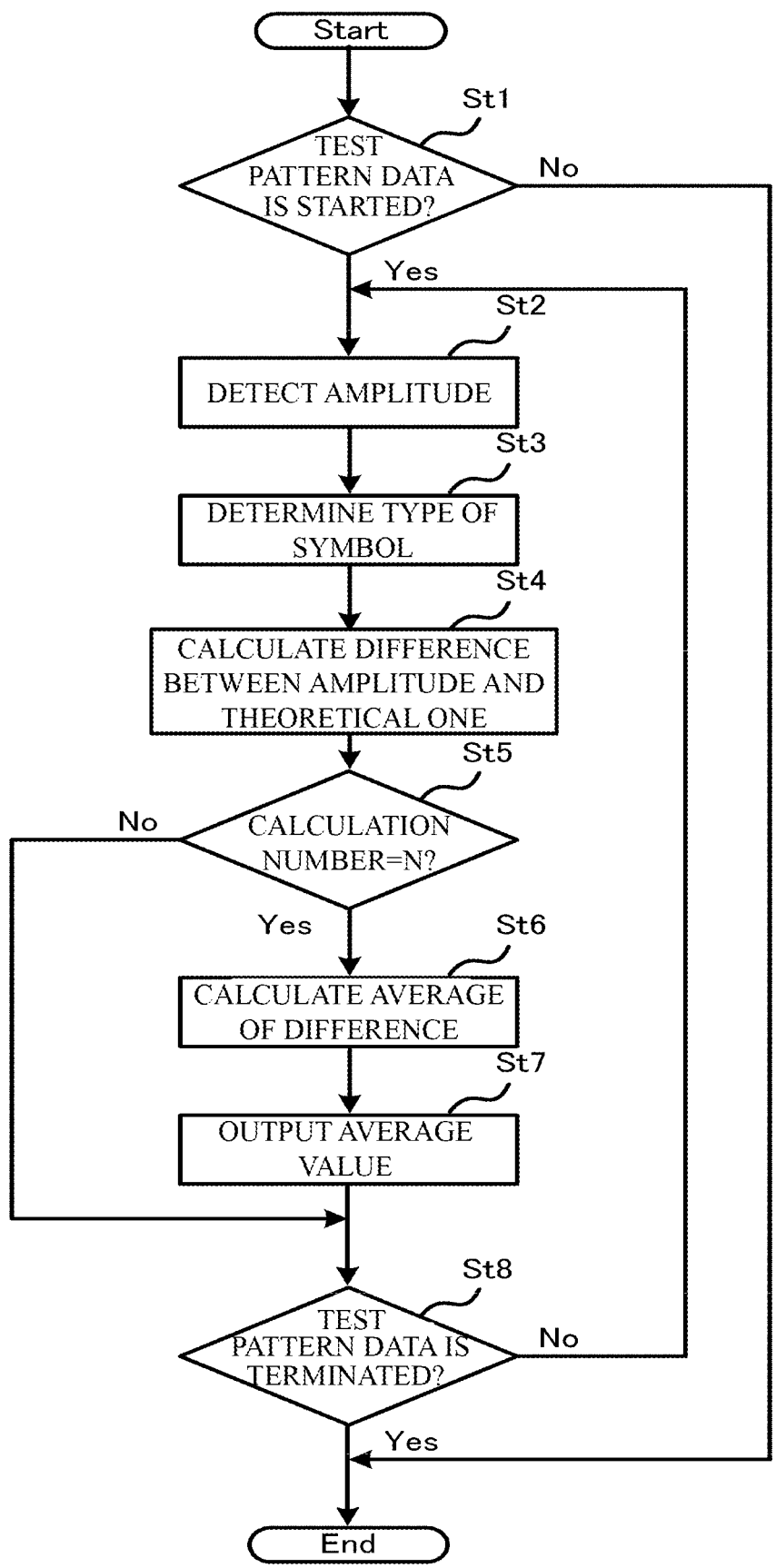
FIG. 11 illustrates a flowchart of an example of processes executed by a correction value calculator.

FIG. 11 illustrates a flowchart of an example of the processes executed by the correction value calculator 102. For example, the processes are periodically executed.

The correction value calculator 102 determines whether the outputting of the test pattern data from the filter 5 is started by the synchronization process with respect to the output signals Hy and Vy (Step SU). The correction value calculator 102 terminates the process when the outputting of the test pattern data is not started (No in Step St1).

The correction value calculator 102 detects the amplitude yh(m) and yv(m) of the test pattern data of the output signals Hy and Vy (Step St2), when the outputting of the test pattern data is started (Yes in Step SU). Next, the correction value calculator 102 determines the type # k of the symbol of the test pattern data of the output signals Hy and Vy (Step St3). Each process of Step St5 to St7 is executed with respect to each of the type # k of the symbol.

The correction value calculator 102 calculates the difference ΔR(k) between the absolute value of the detected amplitude yh(m) and yv(m) and the theoretical amplitude Ra_ideal(k) (Step St4). Next, the correction value calculator 102 determines whether the calculation number of the difference ΔR(k) reaches N (Step St5). The correction value calculator 102 executes the process of Step St8 described later, when the calculation number is less than N (No in Step St5). The correction value calculator 102 resets the calculation number to zero every time when the process of Step St6 is finished.

The correction value calculator 102 calculates the average value ΔRav(k) of the differences ΔR(k) (Step St6), when the calculation number reaches N (Yes in Step St5). Next, the correction value calculator 102 outputs the average value ΔRav(k) to the target amplitude corrector 101 (Step St7).

Next, the correction value calculator 102 determines whether the outputting of the test pattern is finished (Step St8). The correction value calculator 102 executes the process of Step St2 again, when the outputting of the test pattern data is not finished (No in Step St8). The correction value calculator 102 terminates the process, when the outputting of the test pattern data is finished (Yes in Step St8). In this manner, the process of the correction value calculator 102 is executed.

Figure 12:
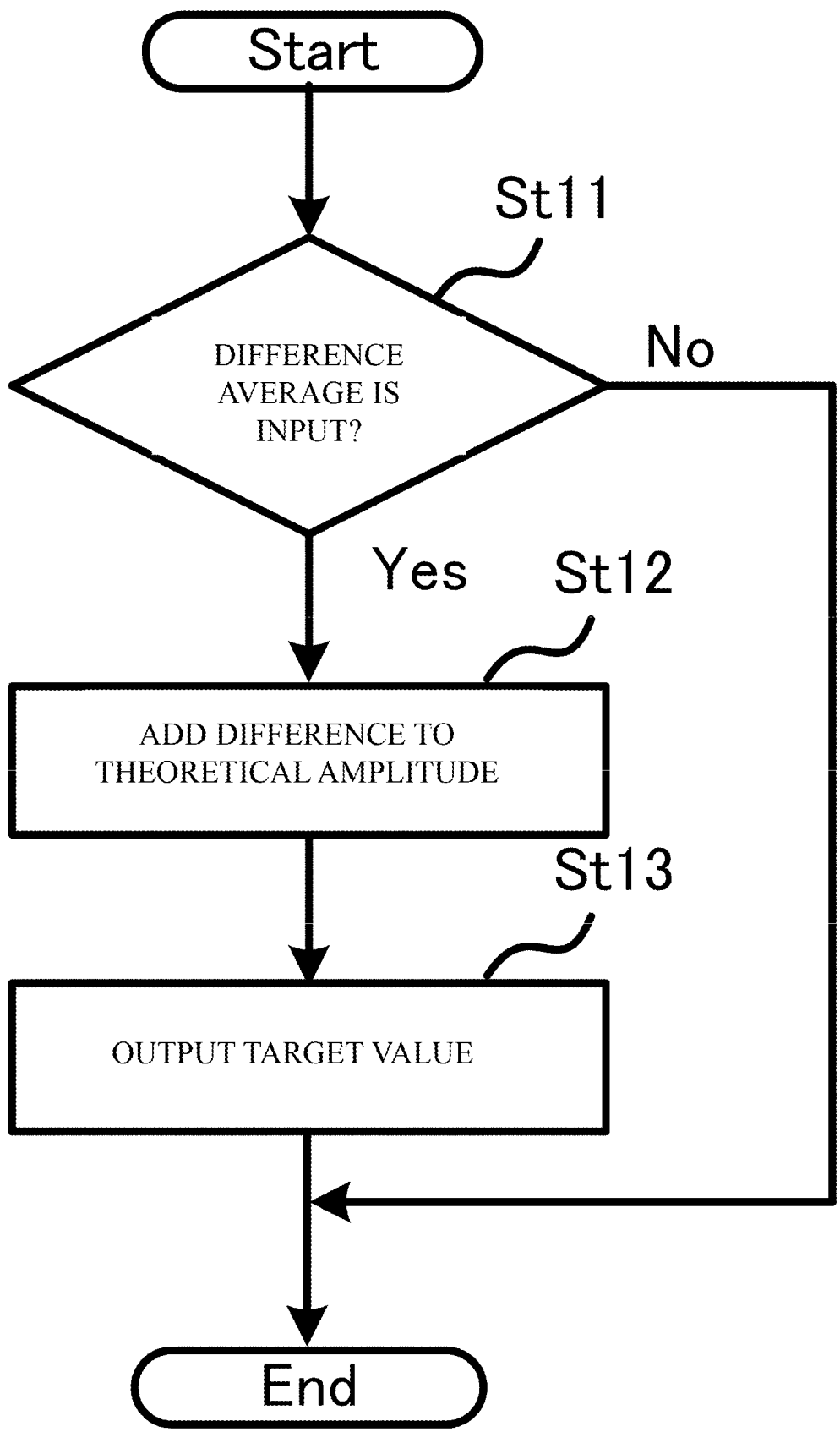
FIG. 12 illustrates an example of a flowchart of processes of a target amplitude corrector.

FIG. 12 illustrates an example of a flowchart of the processes of the target amplitude corrector 101. For example, the processes are periodically executed with respect to each type # k of the symbol.

The target amplitude corrector 101 determines whether the correction value calculator 102 inputs the average value ΔRav(k) of the differences ΔR(k) into the target amplitude corrector 101 (Step St11). The target amplitude corrector 101 terminates the process, when the average Rav(k) is not input (No in Step St11).

The target amplitude corrector 101 adds the difference ΔR(k) to the theoretical amplitude Ra_ideal (k) (Step St12), when the average value Rav(k) is input (Yes in Step St11). Next, the target amplitude corrector 101 outputs the calculated value after the adding to the coefficient updater 100, as the target value Ra(k) (Step St13).

Next, a description will be given of the process of the CPU 10 corresponding to the structure of FIG. 8.

Figure 13:
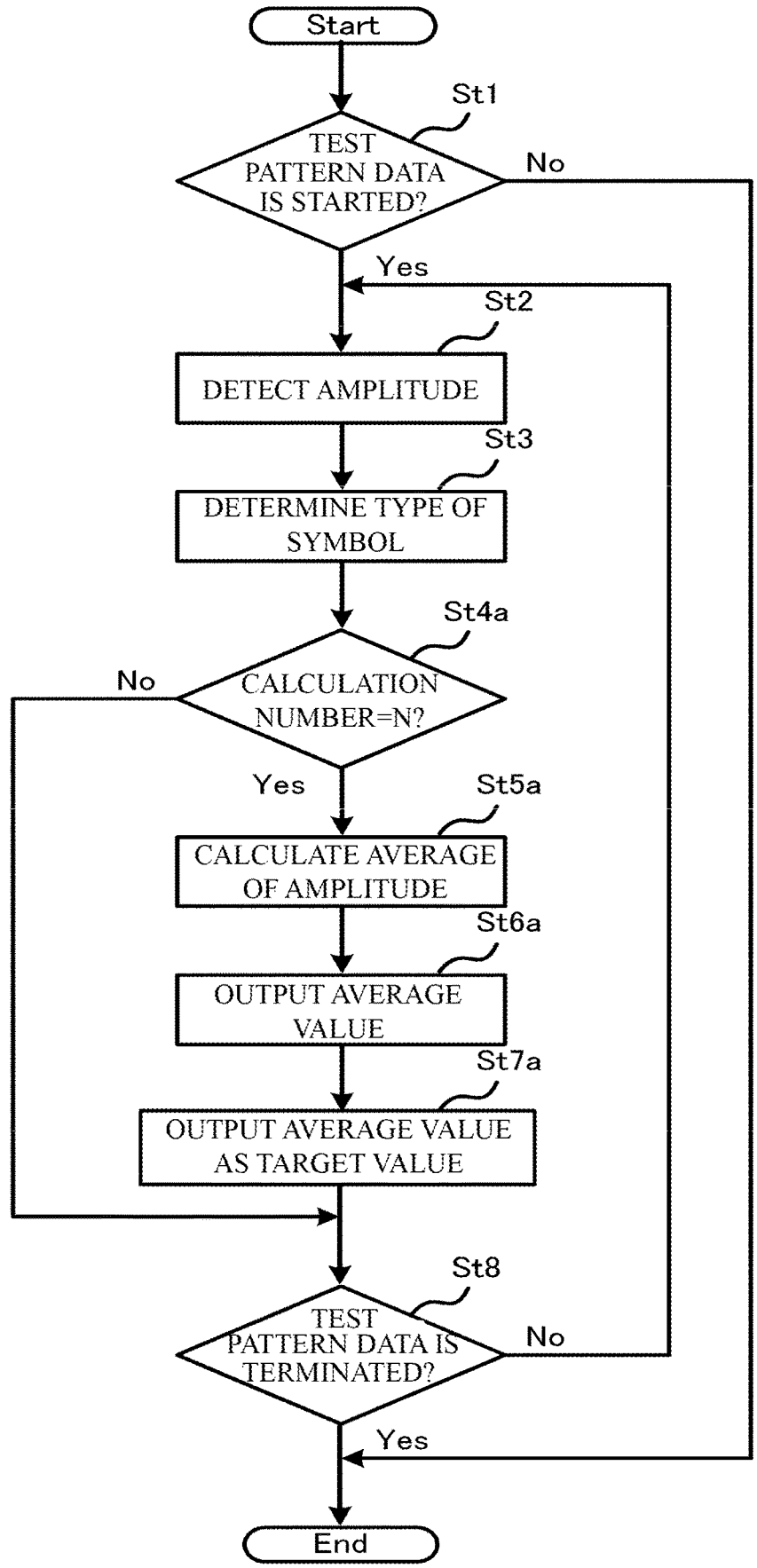
FIG. 13 illustrates a flowchart of another example of processes of a correction value calculator and a target amplitude corrector.

FIG. 13 illustrates a flowchart of another example of the processes of the correction value calculator 102 and the target amplitude corrector 101. In FIG. 13, the same numerals are added to the same processes as FIG. 11. An explanation of the same processes is omitted. Each process of Step St4a to St7a is executed with respect to each of the type # k of the symbol.

The correction value calculator 102 determines whether the detection number of the amplitude yh(m) and yv(m) reaches N, after the execution of Step St3 (Step St4a). The correction value calculator 102 executes the process of Step St8, when the detection number is less than N (No in Step St4a). The correction value calculator 102 resets the detection number to zero every time when the process of Step St5a is finished.

The correction value calculator 102 calculates the average Yav(k) of the absolute values of the amplitude yh(m) and yv(m) (Step St5a), when the detection number reaches N (Yes in Step St4a). Next, the correction value calculator 102 outputs the average Yav(k) to the target amplitude corrector 101 (Step St6a).

The target amplitude corrector 101 outputs the average value Yav(k) to the coefficient updater 100, as the target value Ra(k) (Step St7a). In this manner, the processes of the correction value calculator 102 and the target amplitude corrector 101 are executed.

In the embodiment, it is possible to improve the signal quality, because the correction of the target value Ra(k) described with reference to FIG. 4 to FIG. 8 is possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A signal processing device of a receiver that receives an optical signal transmitted by a transmitter, comprising:
    a converting circuit configured to convert the optical signal into an electrical signal;
    a filter configured to perform an adaptive equalization process of the electrical signal, on a basis of a filter coefficient;
    an update circuit configured to update the filter coefficient, on a basis of amplitude of the electrical signal and a target value of the amplitude for the adaptive equalization of the electrical signal;
    a calculation circuit configured to calculate a first difference between the amplitude of the electrical signal output from the filter and a theoretical amplitude of the electrical signal without signal distortion; and
    a correction circuit configured to correct the target value, on a basis of the first difference,
    wherein the update circuit calculates the filter coefficient, on a basis of the amplitude of the electrical signal input to the filter, and a second difference between the amplitude of the electrical signal output from the filter and the target value corrected by the correction circuit.

2. The signal processing device as claimed in claim 1, wherein:
    the calculation circuit is configured to calculate the first difference twice or more by repeating a calculation of the first difference and calculate an average value of the first difference calculated twice or more; and
    the correction circuit is configured to correct the target value, with use of the average value.

3. The signal processing device as claimed in claim 1, wherein:
    symbols of a predetermined pattern is inserted into the electrical signal; and
    the correction circuit is configured to correct the target value with respect to each type of the symbols by using the theoretical amplitude for each type of the symbols.

4. A signal processing method for a receiver that receives an optical signal transmitted by a transmitter, comprising:
    converting the optical signal into an electrical signal;
    performing an adaptive equalization process of the electrical signal, on a basis of a filter coefficient;
    updating the filter coefficient, on a basis of amplitude of the electrical signal and a target value of the amplitude for the adaptive equalization of the electrical signal;
    calculating a first difference between the amplitude of the electrical signal output from the filter and a theoretical amplitude of the electrical signal without signal distortion; and
    correcting the target value, on a basis of the first difference,
    wherein the updating includes calculating the filter coefficient, on a basis of the amplitude of the electrical signal input to the filter, and a second difference between the amplitude of the electrical signal output from the filter and the target value corrected by the correction circuit.

5. The method as claimed in claim 4, wherein:
    the first difference is calculated twice or more by repeating a calculation of the first difference and an average value of the first difference calculated twice or more is calculated; and
    the target value is corrected, with use of the average value.

6. The method as claimed in claim 4, wherein:
    symbols of a predetermined pattern is inserted into the electrical signal; and
    the target value is corrected with respect to each type of the symbols by using the theoretical amplitude for each type of the symbols.

* * * * *